United States Patent
Fahandezh Saadi et al.

(10) Patent No.: US 11,321,586 B2
(45) Date of Patent: May 3, 2022

(54) METHOD, APPARATUS, AND COMPUTER PROGRAM PRODUCT FOR DETERMINING BURNER OPERATING STATE

(71) Applicant: Honeywell International Inc., Morris Plains, NJ (US)

(72) Inventors: Mohammad Hadi Fahandezh Saadi, Morris Plains, NJ (US); Raghava Balusu, Gudivada (IN); Vijayendra Grampurohit, Hubli (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 45 days.

(21) Appl. No.: 16/582,641

(22) Filed: Sep. 25, 2019

(65) Prior Publication Data

US 2021/0089821 A1 Mar. 25, 2021

(51) Int. Cl.
*G06K 9/62* (2006.01)
*G06N 20/00* (2019.01)
*G06N 5/04* (2006.01)

(52) U.S. Cl.
CPC ......... *G06K 9/6256* (2013.01); *G06K 9/6201* (2013.01); *G06N 5/04* (2013.01); *G06N 20/00* (2019.01)

(58) Field of Classification Search
CPC .... G06K 9/6256; G06K 9/6201; G06N 20/00; G06N 5/04; G05B 2219/2649; G05B 23/024
USPC ........................................................ 382/159
See application file for complete search history.

(56) References Cited

U.S. PATENT DOCUMENTS

| | | | |
|---|---|---|---|
| 7,945,397 B2 | 5/2011 | Kar | |
| 8,138,927 B2 * | 3/2012 | Diepenbroek | ....... G05B 23/024 340/577 |

(Continued)

FOREIGN PATENT DOCUMENTS

| | | |
|---|---|---|
| CN | 107844770 A | 3/2018 |
| WO | 2008/116037 A1 | 9/2008 |
| WO | 2017/058832 A1 | 4/2017 |

OTHER PUBLICATIONS

Extended European Search Report issued in European Application No. 20196777.5 dated Feb. 16, 2021, 6 pages.

(Continued)

*Primary Examiner* — Juan A Torres
(74) *Attorney, Agent, or Firm* — Alston & Bird LLP

(57) ABSTRACT

A method is provided for determining an operating state of a burner. The method includes receiving baseline characteristic data for a plurality of burner operating states. The baseline characteristic data for each burner operating state of the plurality of burner operating states comprises baseline data of a plurality of data types indicative of a corresponding burner operating state. The method also includes receiving monitoring data captured for a burner by a plurality of burner sensors. The method further includes using to machine learning to compare at least a portion of the monitoring data captured for the burner with the baseline characteristic data. The method still further includes determining an operating state of the burner based at least in part on results of comparing the at least a portion of the monitoring data with the baseline characteristic data. A corresponding apparatus and computer program product are also provided.

28 Claims, 4 Drawing Sheets

(56) References Cited

U.S. PATENT DOCUMENTS

| | | |
|---|---|---|
| 8,473,252 B2 | 6/2013 | Kar et al. |
| 8,620,622 B2 | 12/2013 | Kar |
| 8,958,995 B2 | 2/2015 | Kar et al. |
| 8,963,733 B2 | 2/2015 | Kar et al. |
| 9,310,790 B2 | 4/2016 | Krishnaswamy et al. |
| 9,618,037 B2 | 4/2017 | Kar et al. |
| 10,928,807 B2 | 2/2021 | Rashidi et al. |
| 2008/0233523 A1* | 9/2008 | Diepenbroek ............ F23G 5/50 431/14 |
| 2011/0085030 A1* | 4/2011 | Poe ............................ F23N 5/08 348/61 |
| 2012/0330577 A1 | 12/2012 | Kar |
| 2012/0330578 A1 | 12/2012 | Kar et al. |
| 2012/0330614 A1 | 12/2012 | Kar |
| 2015/0066163 A1 | 3/2015 | Sunderam |
| 2015/0167972 A1* | 6/2015 | Zhdaneev ............... F23N 5/242 431/5 |
| 2017/0219208 A1 | 8/2017 | Song et al. |
| 2017/0277142 A1 | 9/2017 | Krishnaswamy et al. |
| 2018/0266680 A1* | 9/2018 | Arabi .................... G01J 5/0018 |
| 2019/0384255 A1 | 12/2019 | Krishnaswamy et al. |

OTHER PUBLICATIONS

Zhong, et al. "A convolutional neural network-based flame detection method in video sequence," Signal, Image and Video Processing (2018) 12:1619-1627. https://doi.org/10.1007/s11760-018-1319-4.

* cited by examiner

METHOD, APPARATUS, AND COMPUTER PROGRAM PRODUCT FOR DETERMINING BURNER OPERATING STATE

TECHNOLOGICAL FIELD

Example embodiments of the present disclosure relate generally to burner operation and, more particularly, to the determination of operating states of a burner.

BACKGROUND

Without time-consuming, manual inspections of individual burners, detection of faulty burner operation has generally been difficult. As there may be a large quantity of burners located within furnaces and other heating vessels, inspecting individual burners can often be an extremely time-intensive task, and faulty burners may not be identified for several days after those burners have ceased proper functionality. Additionally, technical expertise on burner operation can also be scarce. Through applied effort, ingenuity, and innovation, many of these identified problems have been solved by developing solutions that are included in embodiments of the present disclosure, many examples of which are described in detail herein.

BRIEF SUMMARY

Methods, apparatuses, and computer program products of various embodiments are provided herein for determining an operating state of a burner. In an example embodiment, a method is provided for determination an operating state of a burner. The method includes receiving baseline characteristic data for a plurality of burner operating states. The baseline characteristic data for each burner operating state of the plurality of burner operating states includes baseline data of a plurality of data types indicative of a corresponding burner operating state. The method also includes receiving monitoring data captured for a burner by a plurality of burner sensors. The method further includes comparing, via machine learning, at least a portion of the monitoring data captured for the burner with the baseline characteristic data. The method still further includes determining an operating state of the burner based at least in part on results of comparing the at least a portion of the monitoring data with the baseline characteristic data.

In some embodiments, the method also includes generating at least a portion of the baseline characteristic data by classifying an operating state associated with monitoring data captured during one or more trial runs of the burner. In some embodiments, the method also includes generating at least a portion of the baseline characteristic data by augmenting monitoring data captured during one or more trial runs of the burner.

In some embodiments, the baseline characteristic data for each of the plurality of burner operating states includes at least two of sound data, image data, or process data. In some embodiments, the monitoring data includes a time stamp, and the method further includes matching the monitoring data from the at least two of sound data, image data, or process data of the monitoring data based at least in part on the time stamp. In some embodiments, the monitoring data includes process data and at least one of image data or sound data. In some embodiments, the baseline data of the baseline characteristic data includes image data and the image data includes video data. In some embodiments, the baseline data of the baseline characteristic data includes process data and the process data includes data relating to operating parameters of the burner defining at least one of control, output, or environment data. In some embodiments, the method also includes providing a visual display of information relating to the operating state of the burner and information relating to an intended operating state of the burner at a given time.

In another embodiment, an apparatus is provided for determining an operating state of a burner. The apparatus includes at least one processor and at least one non-transitory memory including computer program code instructions, the computer program code instructions configured to, when executed, cause the apparatus to receive baseline characteristic data for a plurality of burner operating states. The baseline characteristic data for each burner operating state of the plurality of burner operating states includes baseline data of a plurality of data types indicative of a corresponding burner operating state. The computer program code instructions are also configured to, when executed, cause the apparatus to receive monitoring data captured for a burner by a plurality of burner sensors. The computer program code instructions are further configured to, when executed, cause the apparatus to compare, via machine learning, at least a portion of the monitoring data captured for the burner with the baseline characteristic data. The computer program code instructions are still further configured to, when executed, cause the apparatus to determine an operating state of the burner based at least in part on results of comparing the at least a portion of the monitoring data with the baseline characteristic data.

In some embodiments, the computer program code instructions are also configured to, when executed, cause the apparatus to generate at least a portion of the baseline characteristic data by classifying an operating state associated with monitoring data captured during one or more trial runs of the burner. In some embodiments, the computer program code instructions are also configured to, when executed, cause the apparatus to generate at least a portion of the baseline characteristic data by augmenting monitoring data captured during one or more trial runs of the burner. In some embodiments, the baseline characteristic data for each of the plurality of burner operating states includes at least two of sound data, image data, or process data.

In some embodiments, the monitoring data includes a time stamp and the computer program code instructions are also configured to, when executed, cause the apparatus to match the monitoring data from the at least two of sound data, image data, or process data of the monitoring data based at least in part on the time stamp. In some embodiments, the monitoring data includes process data and at least one of image data or sound data. In some embodiments, the baseline data of the baseline characteristic data includes image data and the image data includes video data. In some embodiments, the baseline data of the baseline characteristic data includes process data and the process data includes data relating to operating parameters of the burner defining at least one of control, output, or environment data. In some embodiments, the computer program code instructions are also configured to, when executed, cause the apparatus to provide a visual display of information relating to the operating state of the burner and information relating to an intended operating state of the burner at a given time.

In still another embodiment, a computer program product is provided for determining an operating state of a burner. The computer program product includes at least one non-transitory computer-readable storage medium having computer-executable program code portions stored therein, the computer-executable program code portions comprising program code instructions configured to receive baseline characteristic data for a plurality of burner operating states. The baseline characteristic data for each burner operating state of the plurality of burner operating states includes baseline data of a plurality of data types indicative of a corresponding burner operating state. The program code instructions are also configured to receive monitoring data captured for a burner by a plurality of burner sensors. The program code instructions are further configured to compare, via machine learning, at least a portion of the monitoring data captured for the burner with the baseline characteristic data. The program code instructions are still further configured to determine an operating state of the burner based at least in part on results of comparing the at least a portion of the monitoring data with the baseline characteristic data.

In some embodiments, the program code instructions are also configured to generate at least a portion of the baseline characteristic data by classifying an operating state associated with monitoring data captured during one or more trial runs of the burner. In some embodiments, the program code instructions are also configured to generate at least a portion of the baseline characteristic data by augmenting monitoring data captured during one or more trial runs of the burner. In some embodiments, the baseline characteristic data for each of the plurality of burner operating states includes at least two of sound data, image data, or process data.

In some embodiments, the monitoring data includes a time stamp, and the program code instructions are also configured to match the monitoring data from the at least two of sound data, image data, or process data of the monitoring data based at least in part on the time stamp. In some embodiments, the monitoring data includes process data and at least one of image data or sound data. In some embodiments, the baseline data of the baseline characteristic data includes image data and the image data includes video data. In some embodiments, the baseline data of the baseline characteristic data includes process data and the process data includes data relating to operating parameters of the burner defining at least one of control, output, or environment data. In some embodiments, the program code instructions are also configured to provide a visual display of information relating to the operating state of the burner and information relating to an intended operating state of the burner at a given time.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

Various embodiments discussed herein provide a method, apparatus, and a computer program product for determining an operating state of a burner. Current burner fault detection technology using acoustic sensors and/or image sensors are costly to install and operate in areas that burners are used. Various embodiments discussed herein allow for similar fault detection effectiveness without requiring robust sensor installation by using process data along with available imaging and/or acoustic data. Embodiments discussed herein allow for a reduction in manufacturing cost, while maintaining the efficiency of more complex detection mechanisms.

Figure 1:
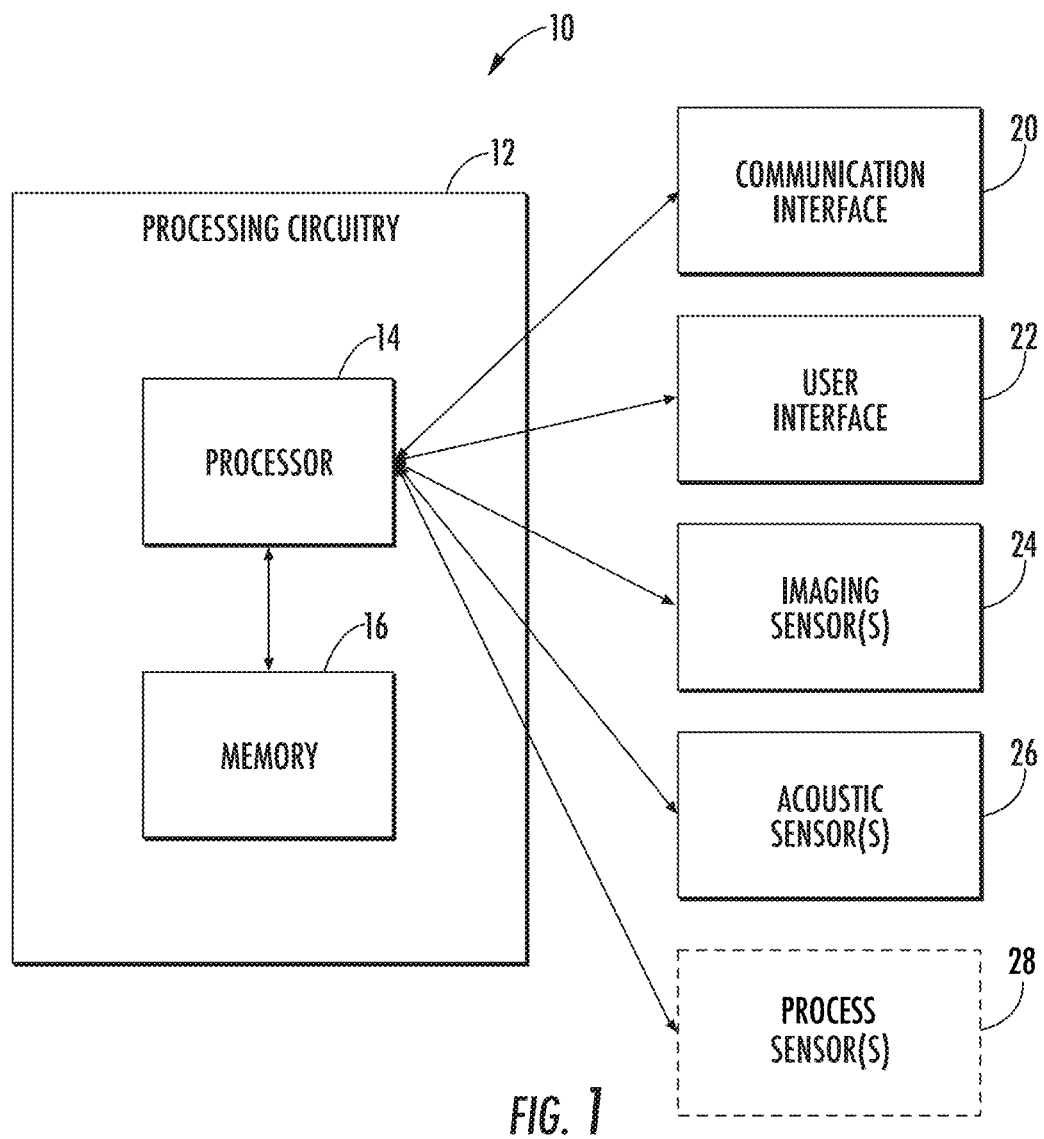
FIG. 1 is a block diagram of an apparatus configured in accordance with an example embodiment of the present disclosure.

FIG. 1 is a schematic diagram of an example apparatus configured for performing any of the operations described herein. Apparatus 10 is an example embodiment that may be embodied by or associated with any of a variety of computing devices. For example, the computing device that embodies the apparatus may be a mobile terminal, a computer terminal, or the like. In other embodiments, the apparatus may be embodied or partially embodied as a mobile terminal, such as a personal digital assistant (PDA), mobile telephone, smart phone, smart watch, tablet computer, an edge device, one or more single-board computers (e.g., raspberry pi), or any combination of the aforementioned and other types of voice and text communications systems.

In an example embodiment, the apparatus may be embodied by or associated with a plurality of computing devices that are in communication with or otherwise networked with one another such that the various functions performed by the apparatus may be divided between the plurality of computing devices that operate in collaboration with one another.

The apparatus 10 may include, be associated with, or may otherwise be in communication with a processing circuitry 12, such as a processor 14 and a memory device 16; a communication interface 20; a user interface 22; one or more burner sensors, such as imaging sensor(s) 24, acoustic sensor(s) 26, and/or process sensor(s) 28. In some embodiments, the processor 14 (and/or co-processors or any other processing circuitry assisting or otherwise associated with the processor) may be in communication with the memory device 16 via a bus for passing information among components of the apparatus. The memory device may be non-transitory and may include, for example, one or more volatile and/or non-volatile memories. In other words, for example, the memory device 16 may be an electronic storage device (for example, a computer readable storage medium) comprising gates configured to store data (for example, bits) that may be retrievable by a machine (for example, a computing device such as the processor). The memory device 16 may be configured to store information, data, content, applications, instructions, or the like for enabling the apparatus to carry out various functions in accordance with an example embodiment of the present disclosure. For example, the memory device 16 could be configured to buffer input data for processing by the processor 14. Additionally or alternatively, the memory device 16 could be configured to store instructions for execution by the processor 14.

The processor 14 may be embodied in a number of different ways. For example, the processor 14 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 14 may include one or more processing cores configured to perform independently. A multi-core processor may enable multiprocessing within a single physical package. Additionally or alternatively, the processor 14 may include one or more processors configured in tandem via the bus to enable independent execution of instructions, pipelining and/or multithreading.

In an example embodiment, the processor 14 may be configured to execute instructions stored in the memory device 16 or otherwise accessible to the processor. Alternatively or additionally, the processor 14 may be configured to execute hard coded functionality. As such, whether configured by hardware or software methods, or by a combination thereof, the processor 14 may represent an entity (for example, physically embodied in circuitry) capable of performing operations according to an embodiment of the present disclosure while configured accordingly. Thus, for example, when the processor 14 is embodied as an ASIC, FPGA or the like, the processor 14 may be specifically configured hardware for conducting the operations described herein. Alternatively, as another example, when the processor 14 is embodied as an executor of software instructions, the instructions may specifically configure the processor 14 to perform the algorithms and/or operations described herein when the instructions are executed. However, in some cases, the processor 14 may be a processor of a specific device (for example, the computing device) configured to employ an embodiment of the present disclosure by further configuration of the processor by instructions for performing the algorithms and/or operations described herein. The processor 14 may include, among other things, a clock, an arithmetic logic unit (ALU) and logic gates configured to support operation of the processor. In some embodiments, the processor 14 may be configured to use machine learning or other operations described herein.

The apparatus 10 of an example embodiment may also include or otherwise be in communication with a user interface 22. The user interface 22 may include a display (e.g., a touch screen display), a speaker, physical buttons, and/or other input/output mechanisms. In an example embodiment, the processor 14 may comprise user interface circuitry configured to control at least some functions of one or more input/output mechanisms. The processor 14 and/or user interface circuitry comprising the processor 14 may be configured to control one or more functions of one or more input/output mechanisms through computer program instructions (for example, software and/or firmware) stored on a memory accessible to the processor (for example, memory device 16, and/or the like). In this regard, the apparatus 10 may interpret data collected by its sensors and provide burner operating state information, for example.

The apparatus 10 of an example embodiment may also include a communication interface 20 that may be any means such as a device or circuitry embodied in either hardware or a combination of hardware and software that is configured to receive and/or transmit data from/to other electronic devices in communication with the apparatus, via wired or wireless technologies. For example, the communication interface 20 may be configured to communicate over wireless communication protocols including WiFi, Bluetooth, NFC (near field communication), and/or other wireless technologies, such as Global System for Mobile Communications (GSM), such as but not limited to Long Term Evolution (LTE). In this regard, the communication interface 20 may include, for example, an antenna (or multiple antennas) and supporting hardware and/or software for enabling communications with a wireless communication network. Additionally or alternatively, the communication interface 20 may include the circuitry for interacting with the antenna(s) to cause transmission of signals via the antenna(s) or to handle receipt of signals received via the antenna(s). In some environments, the communication interface 20 may alternatively or also support wired communication. Although in certain embodiments one or more burner sensors, such as one or more imaging sensors 24, one or more acoustic sensors 26, and/or one or more process sensor 28 may be embodied as a part of the apparatus 10, in various embodiments, the communication interface 20 may also be in communication, wired and/or wirelessly, with one or more burner sensors, such as one or more imaging sensors 24, one or more acoustic sensors 26, and/or one or more process sensor 28. In some embodiments, the apparatus 10 may be in communication with the burner itself (e.g., a smart burner).

The apparatus 10 may be equipped, associated, or in communication with any number of imaging sensor(s) 24, which may embody one or more of the burner sensors. Various embodiments may include the imaging sensor(s) 24 at or near a burner and may be used to determine the operating state of said burner. The imaging sensor(s) 24 may be directional, and the imaging sensor(s) 24 may be positioned such that one or more burners (e.g., a nozzle or cone of a burner) are within the field of view (FOV) of the imaging sensor(s) 24. Moreover, the imaging sensor(s) 24 may be configured to generate an image (e.g., a high-resolution image) of one or more burners, to enable analysis of the functionality of particular portions of the burner(s), for example, by a computing program. In certain embodiments, the imaging sensor(s) are configured to generate full-color images, although it should be understood that certain imaging sensor(s) may be configured to generate black-and-white or grayscale images of one or more burners. The imaging sensor(s) 24 may be a camera, a video camera, and/or the like. The imaging sensor(s) may be configured to operate in accordance with a defined sampling rate (e.g., number of frames per second (fps)). As just one example, the imaging sensor(s) may be configured to collect data (e.g., generate images) at a rate of 30 fps (30 Hz). Any of the imaging sensors 24 may be used to sense information regarding the movement, positioning, or orientation of one or more nearby burners, as described herein according to example embodiments. As just one example, each imaging sensor 24 may be associated with a single burner, such that the imaging sensor 24 is configured to position the single corresponding burner within the FOV of the imaging sensor 24. In various embodiments, the imaging sensor 24 may produce image data used in various embodiments discussed herein. In some example embodiments, such imaging sensors may be implemented in a machine, and the information detected may be transmitted to the apparatus 10, such as by NFC, Bluetooth™ communication, WiFi communication, wired communication, or the like.

The apparatus 10 may be equipped, associated or in communication with any number of acoustic sensor(s) 26. Various embodiments may include the acoustic sensor(s) 26 at or near a burner and may be used to determine the operating state of said burner. The acoustic sensor(s) 26 may be a microphone, sound recording device, and/or the like. The acoustic sensor(s) 26 may have a sample rate approximately equal to the sample rate of other burner sensors, such as the imaging sensor(s) 24. However, in other embodiments, the sample rate of the acoustic sensor(s) 26 may not match the sample rate of other burner sensors, and a computing device may be configured to upsample or downsample burner sensor data (e.g., data collected from the acoustic sensor(s) 26) to match a sample rate of other burner sensors. As just one example, the acoustic sensor(s) 26 may be configured to collect samples at a rate of between about 1 sample/10 seconds (0.1 Hz) and about 1 sample/second (1 Hz). However other sample rates may be utilized in certain embodiments. Any of the acoustic sensors 26 may be used to sense information regarding the movement, positioning, or orientation of one or more nearby burners, as described herein according to example embodiments. The acoustic sensor(s) 26 may be directional (e.g., via included sound isolating cones), and may be configured such that one or more burners are within the field of sound collection of the acoustic sensor(s) 26. In just one example, each acoustic sensor 26 may correspond to a single burner, such that the acoustic sensor 26 is oriented such that the corresponding burner is within the field of sound collection of the acoustic sensor 26. The acoustic sensor 26 may be further oriented to minimize sound collection from sound sources external to the corresponding burner. In various embodiments, the acoustic sensor(s) 26 may produce sound data (e.g., embodied as a plurality of sound samples) used in various embodiments discussed herein. In some example embodiments, such acoustic sensors may be implemented in a machine, and the information detected may be transmitted to the apparatus 10, such as by NFC, Bluetooth™ communication, WiFi communication, wired communication, or the like. In some embodiments, the apparatus 10 may include additional burner sensors configured to collect data other than sound data or image data (e.g., process data). In some embodiments, the apparatus 10 may include means, such as the communication interface 20, for receiving process data from a third-party source. For example, the process data, such as operating parameters of the burner defining at least one of control, output, or environment data, may be received from a burner controller or the like.

In various embodiments, the apparatus 10 may be in communication, directly or via the communication interface 20, with one or more process sensors 28. In various embodiments, the apparatus 10 may receive process data collected by one or more process sensors 28. In various embodiments, a process sensor may include a carbon monoxide (CO) sensor, a carbon dioxide ($CO_2$) sensor, an oxygen ($O_2$) sensor, and/or the like. It should be understood that other sensor types may be utilized to collect process data in certain embodiments.

In various embodiments, the apparatus 10 may receive and/or store data generated by various burner sensors, such as various process data, sound data, and/or image data. In various embodiments, process data may comprise data relating to operating parameters defining control, output, and environment variables, such as throttle position, air valve position, air flow, stack temperatures, carbon monoxide levels (e.g., determined by one or more other burner sensors, such as carbon monoxide sensors), and the like. In various embodiments, the process data may be collected during regular operation of the one or more burners. Sound, or acoustic, data may be embodied as any audio relating to the operation of one or more burners, including time stamped variables such as amplitude max, permutation energy, and the like. In some embodiments, the sound data may be derived from raw audio measurements using acoustic sensor(s) 24 discussed above. In various embodiments, image data may include both still-images and video data relating to operation. The image data of a burner may be preprocessed, such as to isolate and extract portions of the image data reflecting the inner flame generated by the burner in order to use within a model of an example embodiment.

Figure 2:
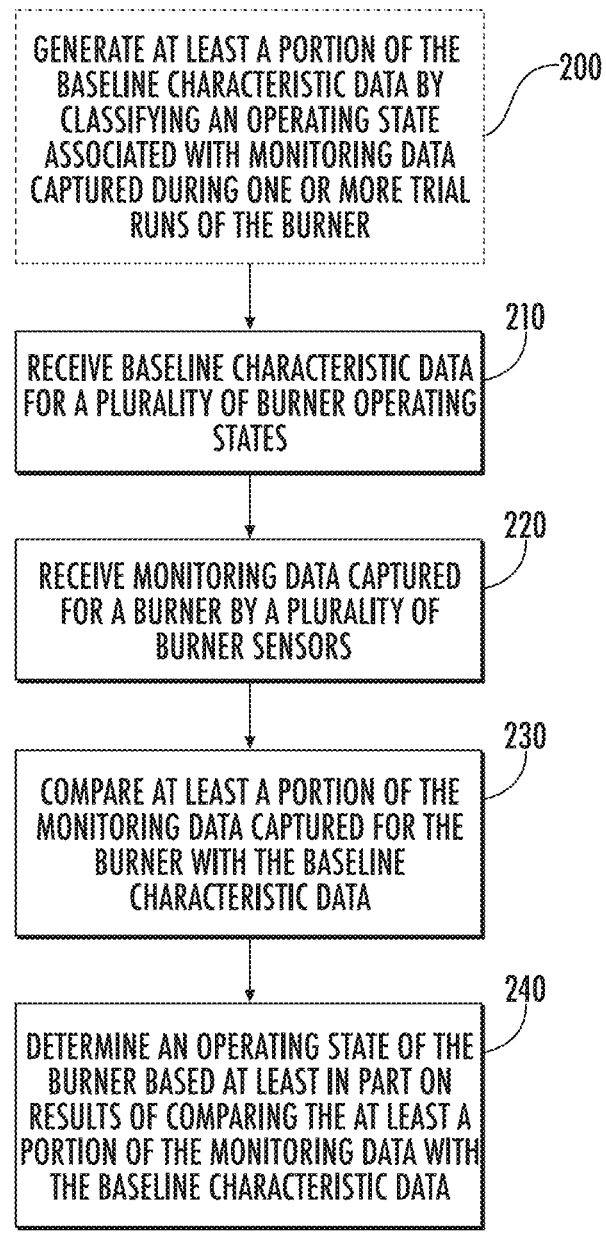
FIG. 2 is a flowchart illustrating a method for determining an operating state of a burner performed in accordance with an example embodiment of the present disclosure.

Referring now to FIG. 2, the operations performed by the apparatus 10 of an example embodiment are depicted. Both FIGS. 1 and 3 may be discussed in reference to FIG. 2 discussed herein. Various steps of the method described herein may be carried out by the apparatus 10 discussed in reference to FIG. 1. In various embodiments, the apparatus 10 may include means for machine-learning ("ML") to identify faulty burner operation. In some embodiments, the apparatus 10 may include means for training the ML system using supervised learning data collected during one or more trial runs. In various embodiments, the training of the ML system may include training for proper operation, training for different types of improper operation (e.g., fuel too rich (e.g., 2% Rich), fuel too lean (e.g., 7% Lean), blocked air blower, blocked fuel port, damaged cone, etc.), training for different burner types, and the like.

In some embodiments, the burner data may be a generic term for the types of data that may be collected. In various embodiments described herein, the baseline characteristic data may be burner data collected during training (e.g., such as during one or more trial runs); in some embodiments, the monitoring data may be burner data collected during actual production runs. As discussed herein in relation to ML, the monitoring data of a production run may be used as baseline characteristic data for subsequent production runs.

Referring now to Block 200 of FIG. 2, the apparatus 10 includes means, such as the processing circuitry 12, the processor 14, or the like, for generating at least a portion of the baseline characteristic data by classifying an operating state associated with monitoring data captured during one or more trial runs of the burner. As noted, various embodiments may utilize a supervised learning model, and therefore, the operating state may be known during one or more trial runs in which the burner data (e.g., monitoring data or baseline characteristic data) may be captured. In various embodiments, the baseline characteristic data may include baseline data of different burner data types such as process data, image data, and/or sound data relating to one or more operating states. In some embodiments, the apparatus 10 may include means, such as the memory device 16, for storing the baseline characteristic data for one or more operating states. In some embodiments, the apparatus 10 may include means, such as the processing circuitry, for generating at least a portion of the baseline characteristic data by augmenting monitoring data captured during one or more trial runs of the burner. As discussed in more detail below, the monitoring characteristic may include process data and at least one of image data or sound data.

In various embodiments, different burners may have different baseline characteristic data corresponding to one or more operating states. Accordingly, in various embodiments the apparatus 10 (e.g., via the ML models and based at least in part on burner data, such as process data) may determine the type of burner for which burner data is collected. This initial determination of the type of burner for which data is collected may be utilized for training the ML model, for example, using baseline characteristic data (e.g., ensuring that data is utilized to train the data for the relevant burner) and/or while collecting monitoring data (e.g., such that the collected monitoring data is compared against relevant baseline characteristic data to precisely identify the operating state of the burner based on baseline characteristic data generated specifically for that burner type). It should be understood that in certain embodiments, a single ML model is utilized for determining a burner state for a plurality of burner types (e.g., wherein the ML model utilizes data indicative of a burner type when determining a burner operating state). In other embodiments, a plurality of ML models may be utilized, with each ML model corresponding to a single burner type (or a subset of all burner types), such that determinations of a burner operating state is determined by a ML model relevant to the particular burner type for which monitoring data is collected. Thus, embodiments are configured to distinguish between burner types because, for example, a burner of a first burner type may be operating normally and have similar sound data (or other burner data) to another burner of a second burner type that is malfunctioning. In various embodiments, the operating state may indicate a malfunction of the burner. Examples of potential burner malfunctions include fuel too rich (e.g., 2% Rich), fuel too lean (e.g., 7% Lean), blocked air blower, blocked fuel port, damaged cone, and the like. In some embodiments, the apparatus 10 includes means for training the ML system (e.g., the model training circuitry 320) for each potential operating state to be tested. In some embodiments, one model may be trained for one or more of the operating states and other models may also be trained for the same and/or different operating states, such that the models when used in combination may be trained for multiple operating states. In some embodiments, a singular model may be trained for each potential operating state tested by the apparatus 10. In various embodiments, the apparatus 10 may be configured to determine important and/or frequently occurring operating states (e.g., an apparatus 10 monitor for 6 classes however more or less classes may be monitored in certain embodiments). In some embodiments, the apparatus 10 may include an "other" determination in an instance the operating state does not correspond to one of the trained operating states.

Referring now to Block 210 of FIG. 2, the apparatus 10 includes means, such as the processing circuitry 12, the processor 14, the communication interface 20, or the like, for receiving baseline characteristic data for a plurality of burner operating states. In some embodiments, the baseline characteristic data may be stored in the memory device 16. In some embodiments, the apparatus 10 may include means, such as the communication interface 20, for receiving the baseline characteristic data from outside of the apparatus 10, such as through a third party (e.g., a database server or the like).

In some embodiments, the baseline characteristic data for each burner operating state may include baseline data of a plurality of data types indicative of a corresponding burner operating state. In various embodiments, the baseline characteristic data for each of the plurality of burner operating states may include baseline data of different burner data types including sound data, image data, and/or process data. In some embodiments, the baseline characteristic data for each of the plurality of burner operating states may include one or more (e.g., at least two) of sound data, image data, or process data. For example, the baseline characteristic data may include sound data or image data in addition to process data for the burner. In some embodiments, the apparatus 10 may include one or more models (e.g., as a part of the training model circuitry 320 shown in FIG. 3). In some embodiments, the apparatus 10 may include one or more models that are configured to use a specific data type. For example, the apparatus 10 may include one model configured to use image data only, one model configured to use acoustic data only, and/or one model configured to use process data only. In some embodiments, the apparatus 10 may include one or more models that are configured to use two data types (e.g., two out of image data, acoustic data, or process data). In some embodiments, an apparatus 10 may include a model that is configured to use three data types (e.g., each of image data, acoustic data, and process data). In some embodiments where the baseline characteristic data includes image data, the image data may include video data. In some embodiments where the baseline characteristic data includes process data, the process data may include data relating to the operating parameters of the burner defining at least one of control, output, or environment data.

In various embodiments, baseline characteristic data may be generated during one or more trial runs, defined as an operating run in which the operating state is known. For example, in an instance the burner is operating normally, the burner may have a specific appearance (e.g., image data) and/or a specific sound (e.g., acoustic data) at various times during operation. Alternatively, in an instance the burner is operating improperly, one or more of the appearance or sound may change over the appearance or sound of a properly operating burner at a given time. At various times in the process (e.g., throttle up and/or down) of the burner, the baseline characteristic data may be different for both properly operating states and improperly operating states. For example, at full throttle, the burner flame may be bluer than at half throttle. In some embodiments, the baseline characteristic data may be captured at various times of a trial run where the burner settings (e.g., burner throttle, operating states, etc.) are known in order to train one or models (e.g. such as by the training model circuitry 320). Additionally, as discussed herein the baseline characteristic data generated via the trial run(s) may be augmented to simulate other operating states as well. For example, a hole may be placed in an image to simulate burner blockages and an image of a burner with a damaged cone may be rotated to simulate cones damaged in other locations.

Referring now to Block 220 of FIG. 2, the apparatus 10 includes means, such as the processing circuitry 12, the processor 14, the communication interface 20, or the like, for receiving monitoring data captured for a burner by a plurality of burner sensors. In various embodiments, the burner sensors may comprise at least one of an imaging sensor 24 or an acoustic sensor 26. In some embodiments, the monitoring data may include at least two of sound data, image data, or process data. In various embodiments, the apparatus 10 may include means for receiving image data from one or more imaging sensors 24 connected to, or in communication with, the apparatus, such as via the communication interface 20. In some embodiments, the apparatus 10 may include means for receiving sound data from one or more acoustic sensors 26 connected to, or in communication with, the apparatus, such as via the communication interface 20. In some embodiments, the apparatus 10 may include means, such as the communication interface 20, for receiving the process data. In various embodiments, the apparatus 10 may receive the process data collected by process sensors currently employed in burners. In some embodiments, the process data may be tracked in a time series database (e.g., a data historian). For example, the apparatus 10 may receive the process data from a time series database via the communication interface 20.

In some embodiments, the apparatus 10 may include means, such as the processing circuitry 12, for matching the monitoring data from the at least two of sound data, image data, or process data of the monitoring characteristic. In some embodiments, the monitoring data may include a time stamp. In some embodiments, the matching of the monitoring data from the at least two of sound data, image data, or process data may be based at least in part on the time stamp of the monitoring data. In some embodiments, the apparatus 10 may include means, such as the processing circuitry 12, for normalizing time stamp information (e.g., convert times to a common time zone). For example, imaging data may use a different standard time zone for time stamps than sound data. In various embodiments, the apparatus 10 may include means, such as the processing circuitry 12, for adjusting the frequency of the different data types (e.g., image data, sound data, process data) to match with each data type. For example, image data (e.g., video data) may be recorded at 30 hertz (30 frames per second), while the process data and sound data may be recorded at 0.1 hertz (1 sample every 10 seconds) and therefore all of the data types may be converted to a common sample frequency, such as 1 hertz (1 sample per second). In some embodiments, the frequency adjustment may be accomplished through linear interpolation. In some embodiments, the apparatus 10 includes means, such as the processing circuitry 12, for augmenting the monitoring data. For example, the apparatus 10 may isolate and/or remove a portion of image data determined to include an image of the flame generated by the burner, and blacken the area around the burner for a more robust analysis. Examples of images augmented in such a manner are shown in FIGS. 4A-4D.

Referring now to Block 230 of FIG. 2, the apparatus 10 includes means, such as the processing circuitry 12, the processor 14, or the like, for comparing at least a portion of the monitoring data captured for the burner with the baseline characteristic data. In various embodiments, like data types may be compared to like data types. For example, the image data of the monitoring characteristic may be compared to the image data for baseline characteristic data of one or more burner operating states. In some embodiments, the apparatus 10 may include means, such as the processing circuitry 12, for using machine learning to compare at least a portion of the monitoring data captured for the burner with the baseline characteristic data. The apparatus 10 may incorporate any of a variety of machine-learning model types, such as a neural network model, random-forest model, clustering model, and/or the like.

The artificial intelligence (AI) and machine learning employed according to certain example embodiments described herein will now be described. Machine learning is often used to develop a particular pattern recognition model (e.g., a model comprising one or more algorithms that represent a particular pattern recognition problem, such as the comparing of at least a portion of the monitoring data captured for the burner with the baseline characteristic data herein) that is based on statistical inference. In some embodiments, the apparatus 10, such as the processing circuitry 12, the processor 14 or the like, receives large quantities of data (e.g., inputs and outputs) from a variety of sources relating to baseline characteristic data and monitoring data.

For example, a set of clusters may be developed using unsupervised learning, in which the number and respective sizes of the clusters is based on calculations of similarity of features of the patterns within a previously collected training set of patterns. In another example, a classifier representing a particular categorization problem may be developed using supervised learning based on using a training set of patterns and their respective known categorizations. Each training pattern is input to the classifier, and the difference between the output categorization generated by the classifier and the known categorization is used to adjust the classifier coefficients to more accurately represent the problem. A classifier that is developed using supervised learning also is known as a trainable classifier.

In some embodiments, the AI and models described herein use "deep learning". Deep learning is a subset of machine learning that generates models based on training data sets that have been provided. In some embodiments, the models may use unsupervised learning techniques like generative adversarial networks, or variational auto-encoders which have a loss or an objective function. In some embodiments, the models may also use reinforcement learning methods, such as where the objective is to maximize the reward. In some embodiments, the models may also use supervised learning methods, for example feed-forward neural networks where the input data is mapped to target labels. In general, these different methods can share intermediate models as long as the intermediate models are trained iteratively, the intermediate models have internal representations which create positive transfer benefit between tasks, and the respective objectives of the intermediate models can be balanced manually or using multi-objective optimization techniques to allow each use case to achieve good performance and benefit from the positive transfer.

Figure 3:
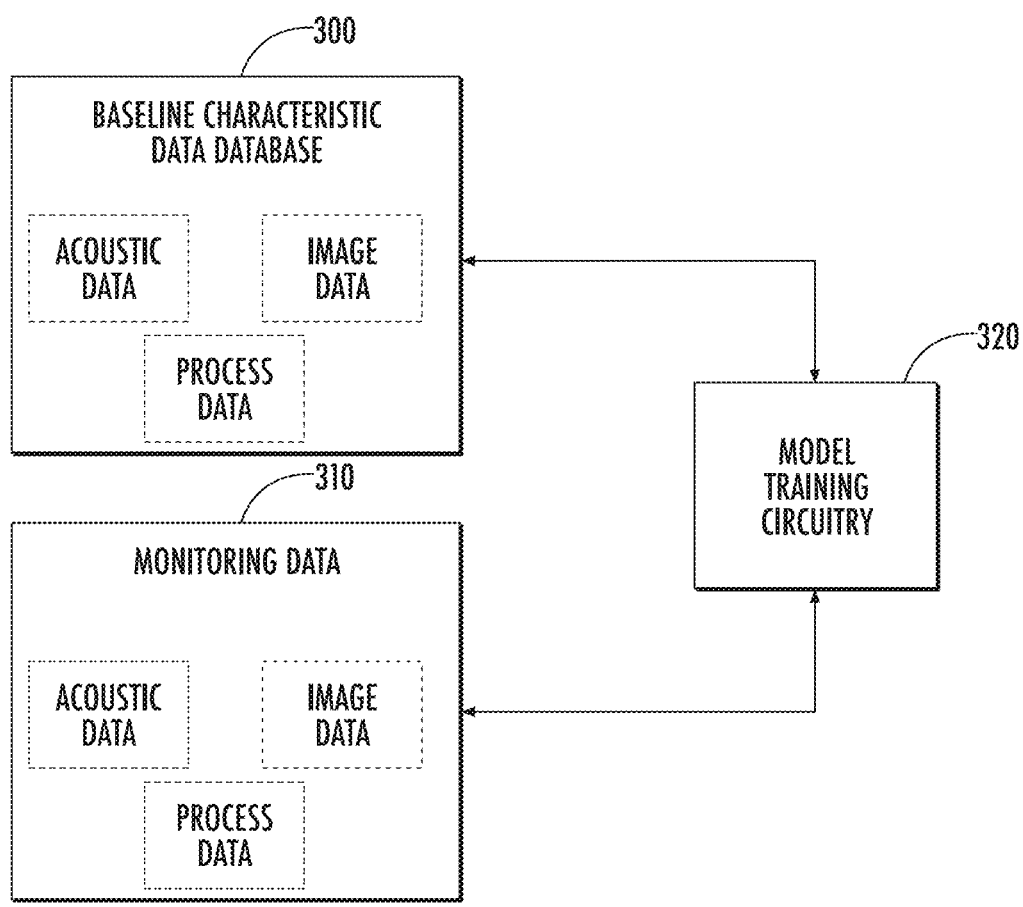
FIG. 3 is a schematic view of the model training circuitry, such as within the processing circuitry of FIG. 1, in accordance with an example embodiment of the present disclosure.

Referring to FIG. 3, the diagram illustrates an example of a machine learning, such as by the processing circuitry 12, during the operation of an example embodiment of the present disclosure. As shown, the baseline characteristics data database 300 may include preexisting data of varying types (e.g., burner data, such as sound data, image data, and/or process data). In some embodiments, the baseline characteristic data database 300 may be in communication with the model training circuitry 320, which may be embodied as a part of the processing circuitry 12 of apparatus 10. In some embodiments, the monitoring data database 310 may be in communication with the model training circuitry 320. In various embodiments, the model training circuitry 320 may include a plurality of models relating to one or more data types. In some embodiments, the image data may be processed using an image classification model (e.g., a Convolutional Neural Network (CNN) Model). In some embodiments, each of the sound data and the process data may be processed by a feed-forward neural network, such as a Multilayer Perceptron (MLP) model. In some embodiments, the monitoring data, after being processed by the model training circuitry 320, may be incorporated into the data models (e.g., along with the baseline characteristic data). In some embodiments, various other models may be trained in accordance with the present disclosure.

Referring now to Block 240 of FIG. 2, the apparatus 10 includes means, such as the processing circuitry 12, the processor 14, or the like, for determining an operating state of the burner based at least in part on results of comparing the at least a portion of the monitoring data with the baseline characteristic data. In various embodiments, the model training circuitry 320, such as by the processing circuitry 12, may provide the probability of one or more operating states. In some embodiments, the apparatus 10 may be configured to determine the operating state from a set of operating states (e.g., a set of the most common operating states). In some embodiments, based on the probability of one or more operating states determined, the apparatus 10, such as by the processing circuitry 12, may determine the operating state of the burner, or the most likely operating state of the burner. For example, the comparison may indicate that the burner is operating normally and therefore the determination of the operating state may indicate that the burner is operating normally.

In some embodiments, the apparatus 10 includes means, such as the user interface 22, for providing information (e.g., via a visual display) relating to the operating state of the burner and information relating to an intended operating state of the burner at a given time. In some embodiments, the visual display may indicate the operating state of the burner. In some embodiments, the apparatus 10, such as the user interface 22, may allow for a user input. In some embodiments, the user input may indicate a change to the burner operation based on the operating state. For example, in an instance an error message is provided to the user, the apparatus 10 may receive an input to turn off the burner until the potential malfunction may be investigated. In some embodiments, the apparatus 10 may provide information to a user device (e.g., a cell phone) audibly and/or tactilely in addition to, or instead of, the visual display.

Figure 4A:
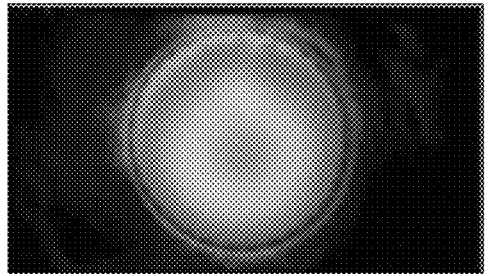
FIGS. 4A-4D illustrate multiple images of a burner in accordance with image data received by an example embodiment of the present disclosure.
Figure 4B:
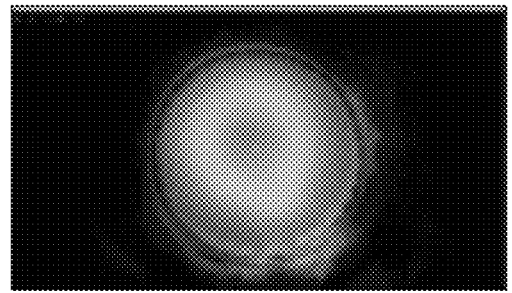
Figure 4C:
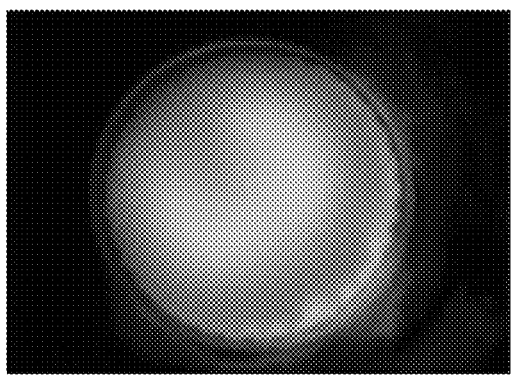
Figure 4D:
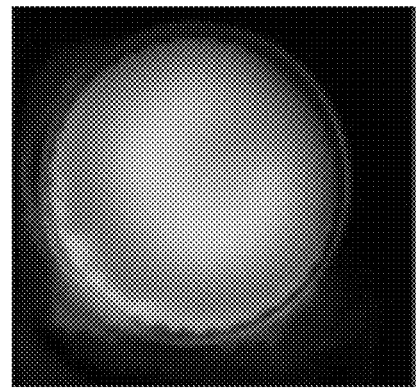

FIGS. 4A-4C are images of a burner at full throttle with three different operating states in accordance with an example embodiment. Each of FIGS. 4A-4C may be either monitoring data and/or a baseline characteristic data. FIG. 4A illustrates the burner in an instance the fuel port may be plugged. FIG. 4B illustrates the burner in an instance the fuel may be too lean (e.g., 7% lean). FIG. 4C illustrates the burner in an instance the fuel port may be blocked. As shown, each of the three images have different visual appearance. In some embodiments, the images of FIGS. 4A-4C may be incorporated as baseline characteristic data for each operating state. In various embodiments, the apparatus 10 may include means, such as the processing circuitry 12, for augmenting at least a portion of the monitoring data and/or baseline characteristic data. FIG. 4D, for example, illustrates an augmentation of FIG. 4C. In some embodiments, such as shown in FIG. 4D, image data (e.g., baseline characteristic data) may be augmented to simulate other errors (e.g., placing holes in the image to simulate burner blockages, rotating one image of a damaged cone to simulate cones damaged in other locations, etc.). In some embodiments, the augmentation may be used to reduce overfitting training data, such that the model will allow for better generalization of new data. In various embodiments, the data may be augmented using image rotation, zooming, and otherwise altering. In some embodiments, the augmentation of data may be used to normalize the data within a set.

Various embodiments discussed herein provide a method, apparatus, and computer program product for determining an operating state of a burner. Various embodiments use machine learning models to allow for similar fault detection effectiveness of expensive sensor configurations without said configurations. This may be accomplished by using process data along with available imaging and/or acoustic data. Embodiments discussed herein allow for a reduction in manufacturing cost, while maintaining the efficiency of more complex detection mechanisms.

FIG. 2 illustrates a flowchart of an apparatus, method and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 16 of an apparatus 10 employing an embodiment of the present invention and executed by a processing circuitry 12 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, some of which have been described above. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method of determining an operating state of a burner, the method comprising:
   receiving baseline characteristic data for a plurality of burner operating states, wherein the baseline characteristic data for each burner operating state of the plurality of burner operating states comprises baseline data of a plurality of data types indicative of a corresponding burner operating state, the plurality of data types comprising process data and at least one of image data and acoustic data;
   receiving monitoring data captured for a burner by a plurality of burner sensors, the monitoring data comprising process data and at least one of image and acoustic data;
   comparing the monitoring data captured for the burner with the baseline characteristic data; and
   determining, based at least in part on results of comparing the monitoring data with the baseline characteristic data, an operating state of the burner.

2. The method of claim 1, further comprising generating at least a portion of the baseline characteristic data by classifying an operating state associated with monitoring data captured during one or more trial runs of the burner.

3. The method of claim 1, further comprising generating at least a portion of the baseline characteristic data by augmenting monitoring data captured during one or more trial runs of the burner.

4. The method of claim 1, wherein the baseline characteristic data for each of the plurality of burner operating states comprises at least two of sound data, image data, or process data.

5. The method of claim 1, further comprising providing a visual display of information relating to the operating state of the burner and information relating to an intended operating state of the burner at a given time.

6. The method of claim 1, further comprising controlling the burner based on the determined operating state of the burner.

7. The method of claim 3, the augmenting of the monitoring data comprising augmenting a first image at least partially defining a first operating state to generate a first augmented image, the first augmented image at least partially defining a second operating state.

8. The method of claim 4, wherein the monitoring data comprises a time stamp, and wherein the method further comprises matching the monitoring data from the at least two of sound data, image data, or process data of the monitoring data based at least in part on the time stamp.

9. The method of claim 4, wherein the baseline data of the baseline characteristic data comprises image data, and wherein the image data comprises video data.

10. The method of claim 4, wherein the baseline data of the baseline characteristic data comprises process data, and wherein the process data comprises data relating to operating parameters of the burner defining at least one of control, output, or environment data.

11. An apparatus for determining an operating state of a burner, the apparatus comprising at least one processor and at least one non-transitory memory including computer program code instructions, the computer program code instructions configured to, when executed, cause the apparatus to:
   receive baseline characteristic data for a plurality of burner operating states, wherein the baseline characteristic data for each burner operating state of the plurality of burner operating states comprises baseline data of a plurality of data types indicative of a corresponding burner operating state, the plurality of data types comprising process data and at least one of image data and acoustic data;
   receive monitoring data captured for a burner by a plurality of burner sensors, the monitoring data comprising process data and at least one of image data and acoustic data;
   compare the monitoring data captured for the burner with the baseline characteristic data; and
   determine, based at least in part on results of comparing the monitoring data with the baseline characteristic data, an operating state of the burner.

12. The apparatus of claim 11, wherein the at least one memory and computer program code are further configured to, with the processor, cause the apparatus to generate at least a portion of the baseline characteristic data by classifying an operating state associated with monitoring data captured during one or more trial runs of the burner.

13. The apparatus of claim 11, wherein the at least one memory and computer program code are further configured to, with the processor, cause the apparatus to generate at least a portion of the baseline characteristic data by augmenting monitoring data captured during one or more trial runs of the burner.

14. The apparatus of claim 11, wherein the baseline characteristic data for each of the plurality of burner operating states comprises at least two of sound data, image data, or process data.

15. The apparatus of claim 11, wherein the at least one memory and computer program code are further configured to, with the processor, cause the apparatus to provide a visual display of information relating to the operating state of the burner and information relating to an intended operating state of the burner at a given time.

16. The apparatus of claim 13, the augmenting of the monitoring data comprising augmenting a first image at least partially defining a first operating state to generate a first augmented image, the first augmented image at least partially defining a second operating state.

17. The apparatus of claim 14, wherein the monitoring data comprises a time stamp, and wherein the at least one memory and computer program code are further configured to, with the processor, cause the apparatus to match the monitoring data from the at least two of sound data, image data, or process data of the monitoring data based at least in part on the time stamp.

18. The apparatus of claim 14, wherein the baseline data of the baseline characteristic data comprises image data, and wherein the image data comprises video data.

19. The apparatus of claim 14, wherein the baseline data of the baseline characteristic data comprises process data, and wherein the process data comprises data relating to operating parameters of the burner defining at least one of control, output, or environment data.

20. A computer program product comprising at least one non-transitory computer-readable storage medium having computer-executable program code portions stored therein, the computer-executable program code portions comprising program code instructions configured to:
receive baseline characteristic data for a plurality of burner operating states, wherein the baseline characteristic data for each burner operating state of the plurality of burner operating states comprises baseline data of a plurality of data types indicative of a corresponding burner operating state, the plurality of data types comprising process data and at least one of image data and acoustic data;
receive monitoring data captured for a burner by a plurality of burner sensors, the monitoring data comprising process data and at least one of image data and acoustic data;
compare the monitoring data captured for the burner with the baseline characteristic data; and
determine, based at least in part on results of comparing the monitoring data with the baseline characteristic data, an operating state of the burner.

21. The computer program product of claim 20, further comprising program code instructions to generate at least a portion of the baseline characteristic data by classifying an operating state associated with monitoring data captured during one or more trial runs of the burner.

22. The computer program product of claim 20, further comprising program code instructions to generate at least a portion of the baseline characteristic data by augmenting monitoring data captured during one or more trial runs of the burner.

23. The computer program product of claim 20, wherein the baseline characteristic data for each of the plurality of burner operating states comprises at least two of sound data, image data, or process data.

24. The computer program product of claim 20, further comprising program code instructions to provide a visual display of information relating to the operating state of the burner and information relating to an intended operating state of the burner at a given time.

25. The computer program product of claim 22, the augmenting of the monitoring data comprises augmenting a first image at least partially defining a first operating state to generate a first augmented image, the first augmented image at least partially defining a second operating state.

26. The computer program product of claim 23, wherein the monitoring data comprises a time stamp, and wherein the computer program product further comprises program code instructions to match the monitoring data from the at least two of sound data, image data, or process data of the monitoring data based at least in part on the time stamp.

27. The computer program product of claim 23, wherein the baseline data of the baseline characteristic data comprises image data, and wherein the image data comprises video data.

28. The computer program product of claim 23, wherein the baseline data of the baseline characteristic data comprises process data, and wherein the process data comprises data relating to operating parameters of the burner defining at least one of control, output, or environment data.

* * * * *